United States Patent
Niesen et al.

(10) Patent No.: US 10,157,161 B2
(45) Date of Patent: Dec. 18, 2018

(54) CONDITIONAL EMBEDDING OF DYNAMICALLY SHIELDED INFORMATION ON A BUS

(71) Applicant: QUALCOMM Incorporated, San Diego, CA (US)

(72) Inventors: Urs Niesen, Summit, NJ (US); Shrinivas Kudekar, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 14/885,942

(22) Filed: Oct. 16, 2015

(65) Prior Publication Data

US 2017/0109313 A1    Apr. 20, 2017

(51) Int. Cl.
  *G06F 13/42* (2006.01)
  *G06F 1/10* (2006.01)
  *H04B 3/32* (2006.01)
  *H04L 12/40* (2006.01)

(52) U.S. Cl.
  CPC .......... *G06F 13/4282* (2013.01); *G06F 1/10* (2013.01); *H04B 3/32* (2013.01); *H04L 12/40* (2013.01)

(58) Field of Classification Search
  CPC .... G06F 1/10; G06F 13/4204; G06F 13/4282; H04B 3/32; H04L 12/40
  See application file for complete search history.

(56) References Cited

U.S. PATENT DOCUMENTS

| | | |
|---|---|---|
| 5,550,864 A | 8/1996 | Toy et al. |
| 6,492,918 B1 | 12/2002 | Rezzi et al. |
| 7,102,544 B1 | 9/2006 | Liu |
| 7,352,299 B1 | 4/2008 | Liu |
| 7,583,209 B1 * | 9/2009 | Duan ............... H03M 5/14 341/50 |
| 8,832,518 B2 | 9/2014 | Litsyn et al. |

(Continued)

FOREIGN PATENT DOCUMENTS

EP     0081750 A1    6/1983

OTHER PUBLICATIONS

Singha, Souvik et al. A Novel Encoding Scheme for Cross-Talk Effect Minimization Using Error Detecting and Correcting Codes. IJEEE vol. 2, No. 4, Dec. 2014, p. 327-331, [online], [retrieved on Jun. 28, 2017]. Retrieved from the Internet <URL:http://www.ijeee.net/uploadfile/2014/0317/20140317104124898.pdf>.*

(Continued)

*Primary Examiner* — Eric T Oberly
(74) *Attorney, Agent, or Firm* — Loza & Loza, LLP

(57) ABSTRACT

System, methods, and apparatus are described for transmitting encoded bits over a bus by conditionally embedding dynamically shielded information. In an example, the apparatus transmits a first group of encoded bits over a bus, generates a second group of encoded bits to be transmitted over the bus, where a first subset of the second group of encoded bits are encoded to avoid crosstalk-inducing bit transitions on adjacent lines of the bus, and configures one or more encoded bits of a second subset of the second group of encoded bits to ensure that the second group of encoded bits includes parity information and/or clock information, while further ensuring that crosstalk-inducing bit transitions in the second group of encoded bits are avoided.

24 Claims, 12 Drawing Sheets

(56) References Cited

U.S. PATENT DOCUMENTS

| | | | |
|---|---|---|---|
| 8,848,781 B2 | 9/2014 | Citta et al. | |
| 2002/0140991 A1* | 10/2002 | Li | H03M 13/03 358/426.13 |
| 2007/0271535 A1* | 11/2007 | Hwang | G06F 13/4072 716/106 |
| 2011/0222622 A1* | 9/2011 | Chang | H04L 25/085 375/285 |
| 2013/0266047 A1* | 10/2013 | Sudhakaran | H04L 25/14 375/219 |
| 2014/0254732 A1* | 9/2014 | Sengoku | H04L 7/033 375/360 |
| 2015/0229325 A1 | 8/2015 | Hollis | |

OTHER PUBLICATIONS

Zhou et al., A Joint-Coding Scheme With Crosstalk Avoidance; Proceedings of the World Congress on Engineering and Computer Science 2011 vol. II WCECS 2011, Oct. 19-21, 2011, San Francisco, USA; retreived May 10, 2018 [online], <URL:http://www.iaeng.org/publication/WCECS2011/WCECS2011_pp720-724.pdf>.*

Deogun H S., et al., "Dynamically Pulsed MTCMOS with Bus Encoding for Total Power and Crosstalk Minimization", Quality of Electronic Design, 2005, ISQED 2005, Sixth International Symposium on San Jose, CA, USA, Mar. 21-23, 2005, Piscataway, NJ, USA, IEEE, Mar. 21, 2005 (Mar. 21, 2005), XP818782831, pp. 88-93.

Harmander S D., et al., "Leakage-and Crosstalk-Aware Bus Encoding for Total Power Reduction", ACM International Conference Proceeding Series, Proceedings of the Twenty-First International Conference on Machine Learning, ACM, New York, US, Jun. 7, 2004 (Jun. 7, 2004), XP058234286, pp. 779-782.

Partial International Search Report and Written Opinion—PCT/US2016/052291—ISA/EPO—dated Dec. 19, 2016.

International Search Report and Written Opinion—PCT/US2016/052291—ISA/EPO—dated Mar. 6, 2017.

Zhang Y., et al., "Codeword Selection for Crosstalk Avoidance and Error Correction on Interconnects," IEEE VLSI Test Symposium, 2008, pp. 377-382.

* cited by examiner

CONDITIONAL EMBEDDING OF DYNAMICALLY SHIELDED INFORMATION ON A BUS

BACKGROUND

Field

The present disclosure relate generally to crosstalk avoidance on a bus, and more particularly, to conditional embedding of dynamically shielded information on a bus.

Background

Crosstalk avoidance coding is a technique to encode data such that it can be transmitted over a capacitively-coupled interconnect (also referred to as a bus) with reduced energy consumption and propagation delay. This may be achieved by prohibiting certain bit transitions on a bus. For example, a crosstalk avoidance code may avoid opposing transitions on adjacent wires of the bus.

Generally, it is desirable to embed additional information into the data to be transmitted over the bus. For example, in order to detect errors, it is useful to ensure that every vector of bits transmitted over the bus has even parity. As another example, in order to embed a clock signal, it is useful to ensure that there is at least one transition on the bus during every clock cycle.

Embedding such additional information in data encoded for crosstalk avoidance is often cumbersome, because the information to be embedded depends on the encoded data to be transmitted and, therefore, is only available after the encoding process is completed. In one conventional approach, for example, static wire shielding is used to encode the parity of the encoded data. However, this approach is inefficient, since it uses two additional wires. The situation is similar for the clock embedding. Therefore, more efficient approaches for embedding additional information in data encoded for crosstalk avoidance are needed.

SUMMARY

The aspects disclosed herein provide systems, methods and apparatus for conditional embedding of dynamically shielded information on a bus.

In an aspect of the disclosure, a method of transmitting data bits includes transmitting a first group of encoded bits over a bus, generating a second group of encoded bits to be transmitted over the bus, where a first subset of the second group of encoded bits includes data bits that are encoded to avoid crosstalk-inducing bit transitions on adjacent lines of the bus, and configuring one or more encoded bits of a second subset of the second group of encoded bits to ensure that the second group of encoded bits includes parity information and to ensure that crosstalk-inducing bit transitions in the second group of encoded bits are avoided.

In an aspect, the parity information enables detection of an erroneous transmission of an encoded hit in the second group of encoded bits. In such aspect, the method may further comprise transmitting the second group of encoded bits over the bus, where the second group of encoded bits is configured to include at least one hit transition with respect to the first group of encoded bits despite the erroneous transmission of a bit in the second group of encoded bits.

In an aspect, the configured one or more encoded bits of the second subset are configured as a data bit or a forced bit that does not carry data. In an aspect, the configured one or more encoded bits of the second subset are further configured to ensure at least one hit transition with respect to the first group of encoded bits. In an aspect, the at least one bit transition with respect to the first group of encoded bits serves as a clock signal. In an aspect, the first group of encoded bits are transmitted over the bus during a first clock cycle and the second group of encoded bits are transmitted over the bus during a second clock cycle. In an aspect, encoded bits of the first subset are transmitted on different lines of the bus than the second subset. In an aspect, the configuring the one or more encoded bits of the second subset of the second group of encoded bits is performed during a single clock cycle.

In an aspect, an apparatus for transmitting data bits over a bus includes a memory and a processing circuit coupled to the memory. The processing circuit is configured to transmit a first group of encoded bits over the bus, generate a second group of encoded bits to be transmitted over the bus, where a first subset of the second group of encoded bits includes data bits that are encoded to avoid crosstalk-inducing bit transitions on adjacent lines of the bus, and configure one or more encoded bits of a second subset of the second group of encoded bits to ensure that the second group of encoded bits includes parity information and to ensure that crosstalk-inducing bit transitions in the second group of encoded bits are avoided.

In an aspect, the parity information enables detection of an erroneous transmission of an encoded hit in the second group of encoded bits. In such aspect, the processing circuit is further configured to transmit the second group of encoded bits over the bus, where the second group of encoded bits is configured to include at least one bit transition with respect to the first group of encoded bits despite the erroneous transmission of a bit in the second group of encoded bits.

In an aspect, the configured one or more encoded bits of the second subset are configured as a data bit or a forced bit that does not carry data. In an aspect, the configured one or more encoded bits of the second subset are further configured to ensure at least one bit transition with respect to the first group of encoded bits. In an aspect, the at least one bit transition with respect to the first group of encoded bits serves as a clock signal. In an aspect, the first group of encoded bits are transmitted over the bus during a first clock cycle and the second group of encoded bits are transmitted over the bus during a second clock cycle. In an aspect, encoded bits of the first subset are transmitted on different lines of the bus than the second subset. In an aspect, the configuring the one or more encoded bits of the second subset of the second group of encoded bits is performed during a single clock cycle.

In an aspect, a method for transmitting data bits includes transmitting a first group of encoded bits over a bus, generating a second group of encoded bits to be transmitted over the bus, where a first subset of the second group of encoded bits includes data bits that are encoded to avoid crosstalk-inducing bit transitions on adjacent lines of the bus, and configuring one or more encoded bits of a second subset of the second group of encoded bits to ensure at least one bit transition with respect to the first group of encoded bits and to ensure that crosstalk-inducing bit transitions in the second group of encoded bits are avoided.

In an aspect, the method further includes determining whether the first subset of the second group of encoded bits includes at least one bit transition with respect to the first group of encoded bits, where the configuration of the one or more encoded bits of the second subset of the second group of encoded bits is based on the determination.

In an aspect, the one or more encoded bits of the second subset of the second group of encoded bits are configured as a data bit or a forced bit that does not carry data. In an aspect, the at least one bit transition with respect to the first group of encoded bits serves as a clock signal. In an aspect, the one or more encoded bits of the second subset of the second group of encoded bits are further configured to ensure that the second group of encoded bits includes parity information.

In an aspect, the method further includes transmitting the second group of encoded bits over the bus, where the first group of encoded bits are transmitted over the bus during a first clock cycle and the second group of encoded bits are transmitted over the bus during a second clock cycle. In an aspect, encoded bits of the first subset are transmitted on different lines of the bus than the second subset.

In an aspect, an apparatus for transmitting encoded bits over a bus includes a memory and a processing circuit coupled to the memory. The processing circuit is configured to transmit a first group of encoded bits over a bus, generate a second group of encoded bits to be transmitted over the bus, where a first subset of the second group of encoded bits includes data bits that are encoded to avoid crosstalk-inducing bit transitions on adjacent lines of the bus, and configure one or more encoded bits of a second subset of the second group of encoded bits to ensure at least one bit transition with respect to the first group of encoded bits and to ensure that crosstalk-inducing bit transitions in the second group of encoded bits are avoided.

In an aspect, the processing circuit is further configured to determine whether the first subset of the second group of encoded bits includes at least one bit transition with respect to the first group of encoded bits, where the configuration of the one or more encoded bits of the second subset of the second group of encoded bits is based on the determination.

In an aspect, the one or more encoded bits of the second subset of the second group of encoded bits are configured as a data bit or a forced bit that does not carry data. In an aspect, the at least one bit transition with respect to the first group of encoded bits serves as a clock signal. In an aspect, the one or more encoded bits of the second subset of the second group of encoded bits are further configured to ensure that the second group of encoded bits includes parity information.

In an aspect, the processing circuit is further configured to transmit the second group of encoded bits over the bus, where the first group of encoded bits are transmitted over the bus during a first clock cycle and the second group of encoded bits are transmitted over the bus during a second clock cycle. In an aspect, encoded bits of the first subset are transmitted on different lines of the bus than the second subset.

DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Overview

A first feature provides for a way to configure encoded bits for parallel transmission over a bus by embedding parity information and while avoiding unnecessary crosstalk-inducing bit transitions (with respect to the previous state of the bus). A second feature provides for a way to configure encoded bits for parallel transmission over a bus by embedding clock information and while avoiding unnecessary crosstalk-inducing bit transitions (with respect to the previous state of the bus). A third feature provides for a way to configure encoded bits for parallel transmission over a bus by embedding parity information and clock information, while avoiding unnecessary crosstalk-inducing bit transitions (with respect to the previous state of the bus). A fourth feature provides for a way to configure encoded bits for parallel transmission over a bus by embedding parity information and clock information such that the clock information is not lost despite any bit transmission errors, and while avoiding unnecessary crosstalk-inducing bit transitions (with respect to the previous state of the bus).

Exemplary Operating Environment

Certain disclosed examples relate to systems and apparatus for transmitting/receiving data bits over a plurality of conductors N conductors). The N conductors (also referred to as N wires or N lines) may include three or more conductors, and each conductor may be referred to as a wire, although the N conductors may include conductive traces on a circuit board or within a conductive layer of a semiconductor integrated circuit (IC) device. The N conductors may be divided into a plurality of transmission groups, each group encoding a portion of a block of data to be transmitted.

Figure 1:
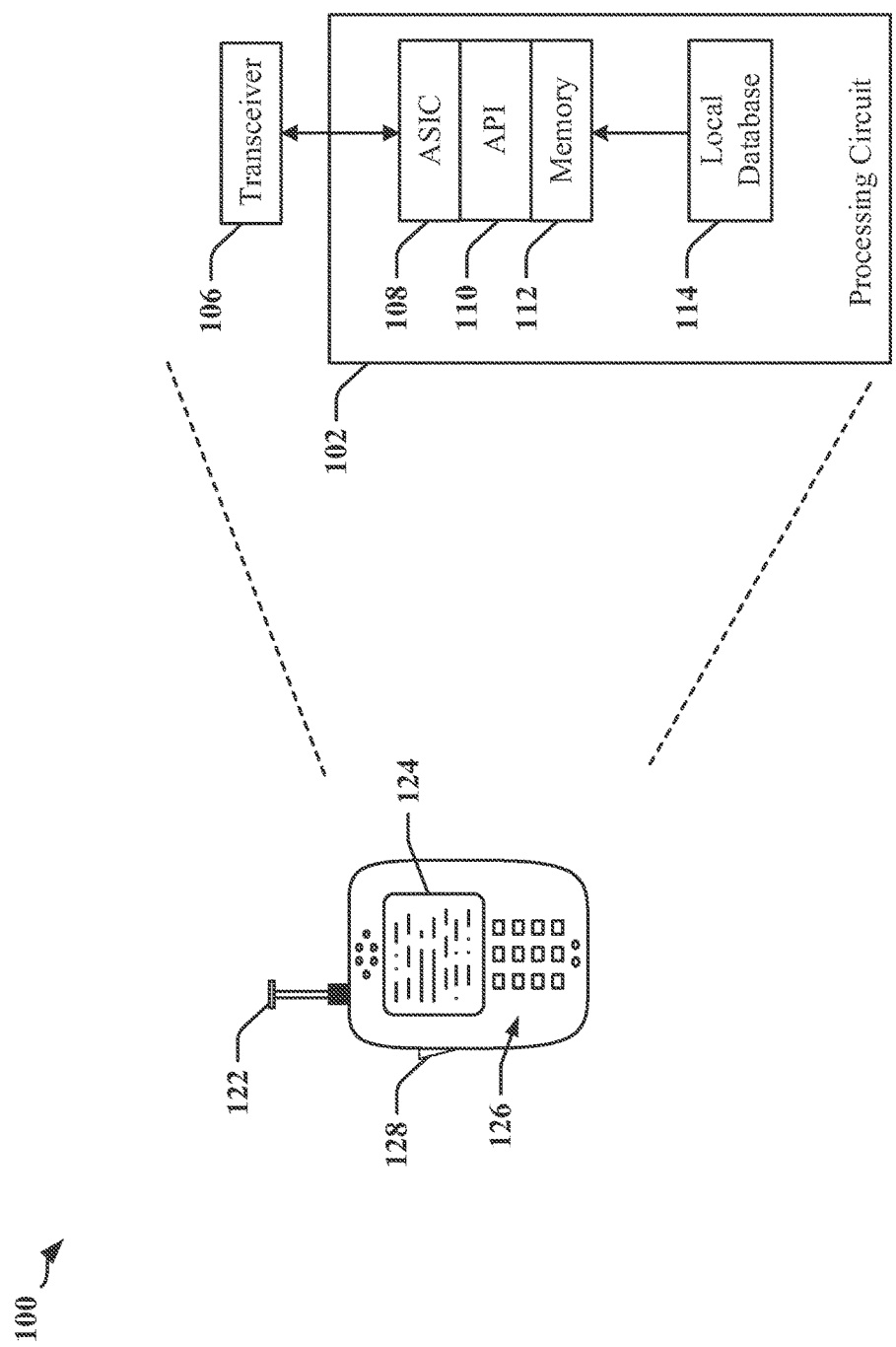
FIG. 1 illustrates an apparatus that employs an encoded data link between devices within the apparatus in accordance with various aspects of the disclosure.

Certain aspects of the disclosure may be applicable to communications links deployed between electronic components, which may include subcomponents of devices such as telephones, mobile computing devices, appliances, automobile electronics, avionics systems, etc. Referring to FIG. 1, for example, an apparatus 100 employing wire encoding/decoding may include a processing circuit 102 that is configured to control operation of the apparatus 100. The processing circuit 102 may access and execute software applications and control logic circuits and other devices within the apparatus 100. In one example, the apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application specific integrated circuit (ASIC) 108. The ASIC 108 may include one or more processing devices, logic circuits, and so on. The processing circuit 102 may include and/or be coupled to processor readable storage 112 that may maintain instructions and data that may be executed by the processing circuit 102. The processing circuit 102 may be controlled by one or more of an operating system and an application programming interface (API) 110 layer that supports and enables execution of software modules residing in the storage 112 of the wireless device. The storage 112 may include read only memory (ROM) or random access memory (RAM), electrically erasable programmable read only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
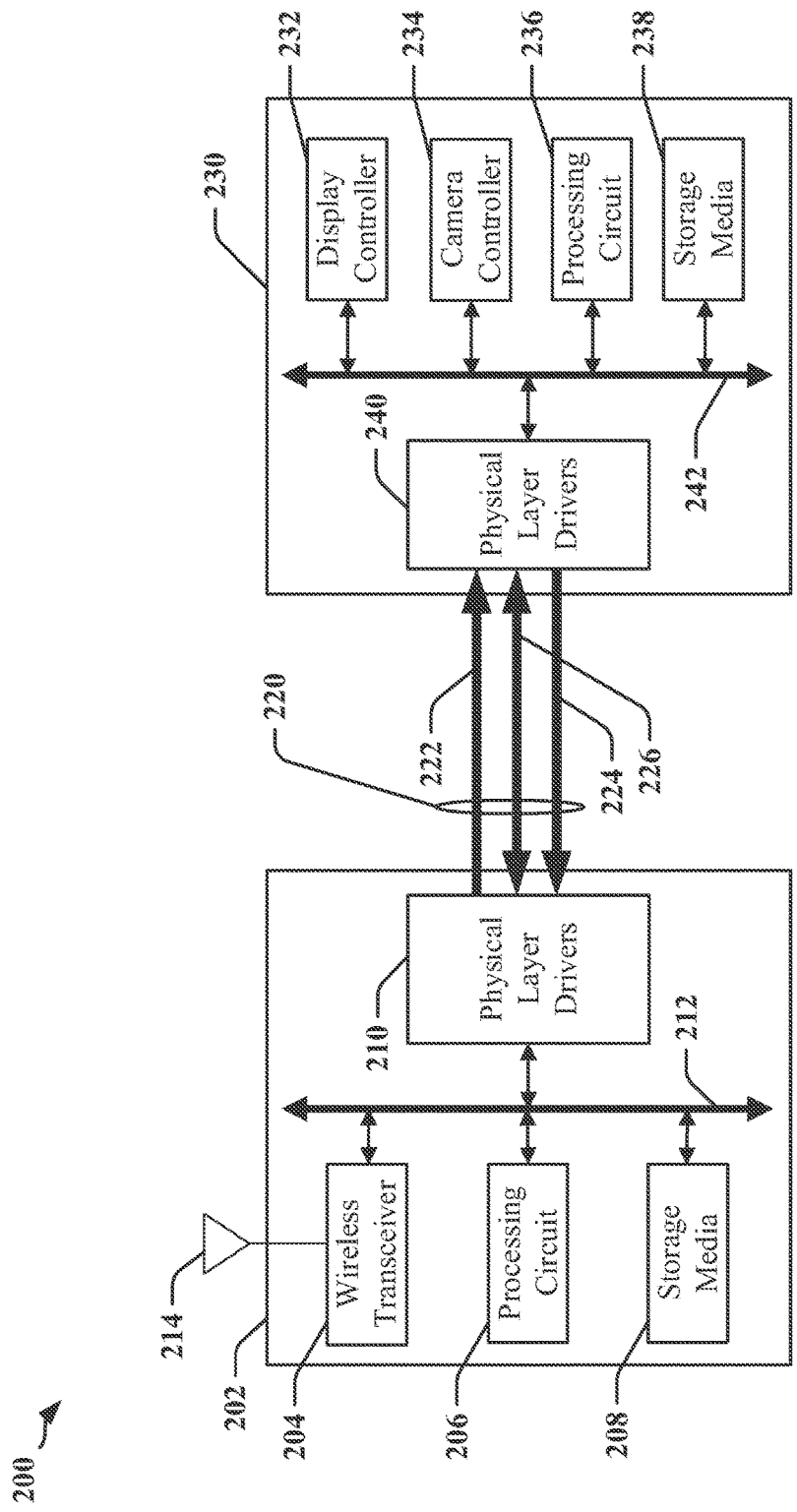
FIG. 2 illustrates a system architecture for an apparatus employing an encoded data link in accordance with various aspects of the disclosure.

FIG. 2 is a block schematic illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may include a plurality of IC devices 202 and 230 that exchange data and control information through a communications link 220. The communications link 220 may be used to connect the IC devices 202 and 230, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. A portion of the communications link 220 may include a cable or an optical connection.

The communications link 220 may include multiple channels 222, 224 and 226. One or more channel 226 may be bidirectional, and may operate in half-duplex mode and/or full-duplex mode. One or more channels 222, 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host, master and/or transmitter, while the second IC device 230 may be designated as a client, slave and/or receiver, even if both IC devices 202 and 230 are configured to transmit and receive on the communications link 220. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator, and so on. The storage media 208 and 238 may include transitory and/or non-transitory storage devices adapted to maintain instructions and data used by the respective processing circuits 206 and 236, and/or other components of the IC devices 202 and 230. Communication between each processing circuit 206, 236 and its corresponding storage media 208 and 238 and other modules and circuits may be facilitated by one or more buses 212 and 242, respectively.

The reverse link 224 may be operated in the same manner as the forward link 222. The forward link 222 and the reverse link 224 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In certain examples, the reverse link 224 derives a clocking signal from the forward link 222 for synchronization purposes, for control purposes, to facilitate power management and/or for simplicity of design. The clocking signal may have a frequency that is obtained by dividing the frequency of a symbol clock used to transmit signals on the forward link 222. The symbol clock may be superimposed or otherwise encoded in symbols transmitted on the forward link 222. The use of a clocking signal that is a derivative of the symbol clock allows fast synchronization of transmitters and receivers (transceivers 210, 240) and enables fast start and stop of data signals without the need for framing to enable training and synchronization.

In certain examples, a single bidirectional link 226 may support communications between the first IC device 202 and the second IC device 230. In some instances, the first IC device 202 and the second IC device 230 provide encoding and decoding of data, address and control signals transmitted between a processing device and memory devices such as dynamic random access memory (DRAM).

Figure 3A:
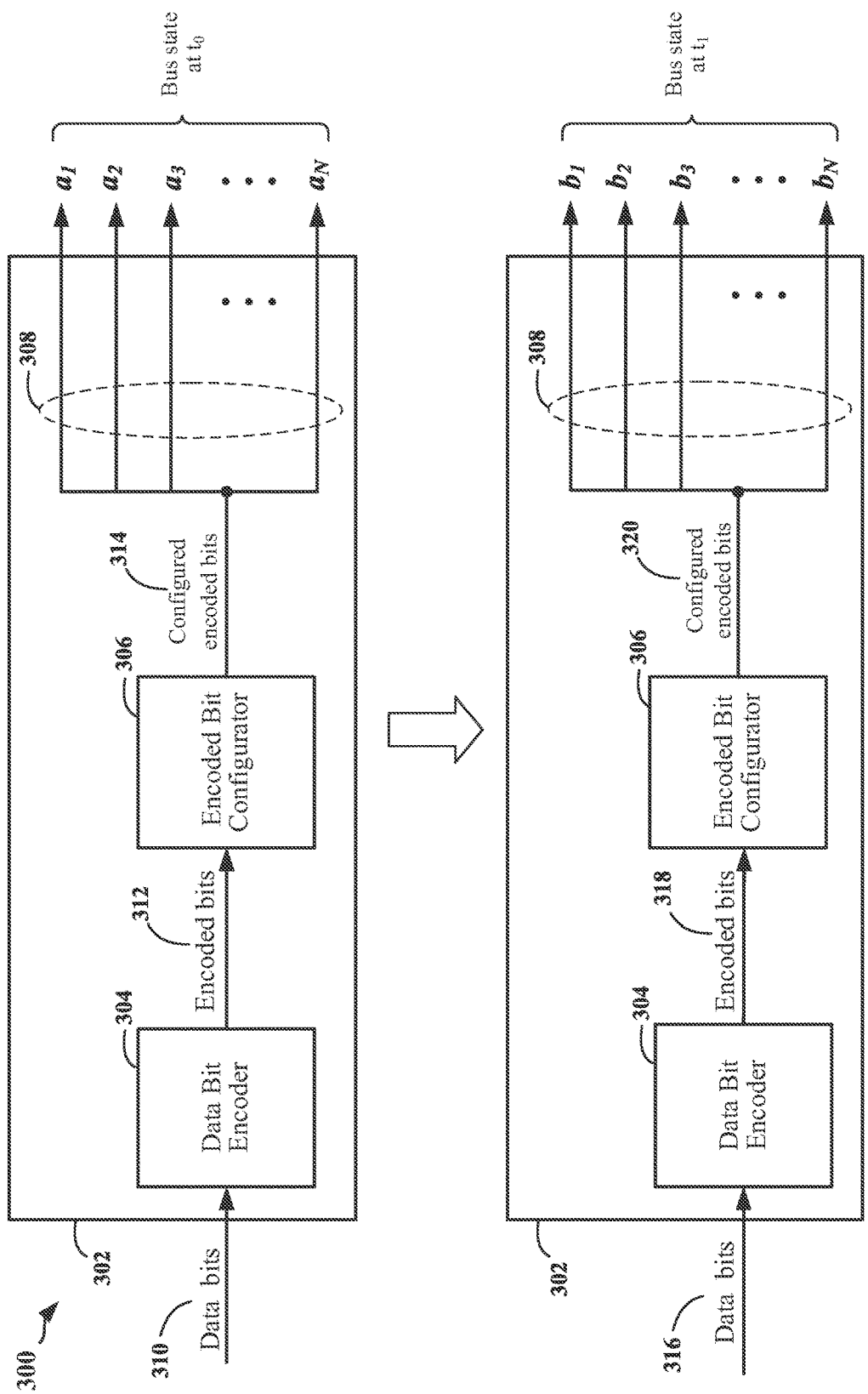
FIG. 3A illustrates an exemplary device for transmitting encoded bits over a bus in accordance with various aspects of the disclosure.

FIG. 3A is a diagram 300 illustrating an exemplary device for transmitting data bits over a bus in accordance with various aspects of the disclosure. As shown in FIG. 3A, electronic device 302 includes a data bit encoder 304, an encoded bit configurator 306, and a bus 308. In an aspect, the bus 308 may have N lines. For example, with reference to the first state of the electronic device 302 displayed at the top of FIG. 3A, the data bit encoder 304 may receive data bits 310 and may generate a first group of encoded bits 312. The first group of encoded bits 312 may be provided to the encoded bit configurator 306 for transmission over the bus 308 at time $t_0$. For example, the first group of encoded bits 312 may be transmitted by the encoded bit configurator 306 as configured encoded bits 314 (e.g., as bits $a_1, a_2, \ldots, a_N$) in parallel over the bus 308 during a first clock cycle. Therefore, the state of the bus 308 at time $t_0$ (e.g., during the first clock cycle) may be represented by the state of the configured encoded bits 314 (e.g., bits $a_1, a_2, \ldots, a_N$) transmitted over the bus 308. With reference to the second state of the electronic device 302 displayed at the bottom of FIG. 3A, the data bit encoder 304 may subsequently receive data bits 316 and may generate a second group of encoded bits 318. The second group of encoded bits 318 may be provided to the encoded bit configurator 306 for transmission over the bus 308 at time $t_1$. For example, the second group of encoded bits 318 may be transmitted by the encoded bit configurator 306 as configured encoded bits 320 (e.g., as bits $b_1, b_2, \ldots, b_N$) in parallel over the bus 308 during a second clock cycle. Therefore, the state of the bus 308 at time $t_1$ (e.g., during the second clock cycle) may be represented by the state of the configured encoded bits 320 (e.g., bits $b_1, b_2, \ldots, b_N$). In an aspect, the data bits 310 and/or the data bits 316 may be received from other components or modules outside the electronic device 302, or may be generated by the electronic device 302.

In an aspect, the data bit encoder 304 may include a sequential crosstalk avoidance encoder. For example, such sequential crosstalk avoidance encoder may encode data bits to be transmitted based on the past state of the bus 308 to reduce or avoid opposing bit transitions (also referred to as crosstalk inducing bit transitions) on adjacent lines of the bus 308. As an example, the sequence of configured encoded bits 314 (e.g., bits $a_1, a_2, \ldots, a_N$) transmitted on the bus 308 at time $t_0$ may represent the past state of the bus 308. For example, with reference to lines $a_1$ and $a_2$ of the bus 308 at $t_0$, and lines $b_1$ and $b_2$ of the bus 308 at $t_1$, opposing bit transitions on adjacent lines of the bus 308 may potentially occur when a bit transmitted on line $a_1$ is '0' and a bit to be transmitted on line $b_1$ is '1', while a bit transmitted on line $a_2$ is '1' and a bit to be transmitted on line $b_2$ is '0'. Therefore, data bits 316 to be transmitted on the bus 308 at time $t_1$ may be encoded sequentially (e.g., by applying one or more transmission constraints to each bit to be transmitted) into a new bus state, such as the sequence of encoded bits 318 (e.g., encoded bits $b_1, b_2, \ldots, b_N$), while taking the past bus state into account to reduce or avoid opposing bit transitions on adjacent lines of the bus 308. In an aspect, a sequential crosstalk avoidance encoder of the data hit encoder 304 may map the data bits 316 to the sequence of encoded bits 318 (e.g., encoded bits $b_1, b_2, \ldots, b_N$) so as to reduce or avoid opposing bit transitions with respect to the state of the bus 308 at time $t_0$. As discussed below, this mapping may be reversed by a decoder at the output of the bus 308, thereby allowing recovery of the data bits by the decoder.

In an aspect, encoded bits (e.g., a first subset of the encoded bits 318) that include the data bits 316 are to be transmitted on lines $b_1, b_2, \ldots, b_{N-3}$ of the bus 308. Such encoded bits have been encoded to avoid crosstalk on the bus 308. In this aspect, the encoded bit configurator 306 in FIG. 3A may embed additional information in the encoded bits (e.g., a second subset of the encoded bits 318) that are to be transmitted on the remaining lines $b_{N-2}, b_{N-1}, b_N$ of the bus 308. This embedding of additional information is performed by the encoded bit configurator 306 such that crosstalk is avoided and the number of bits transmitted over these same three bus lines (e.g., $b_{N-2}, b_{N-1}, b_N$) is maximized. Such embedded information may also be referred to as dynamically shielded information.

Figure 3B:
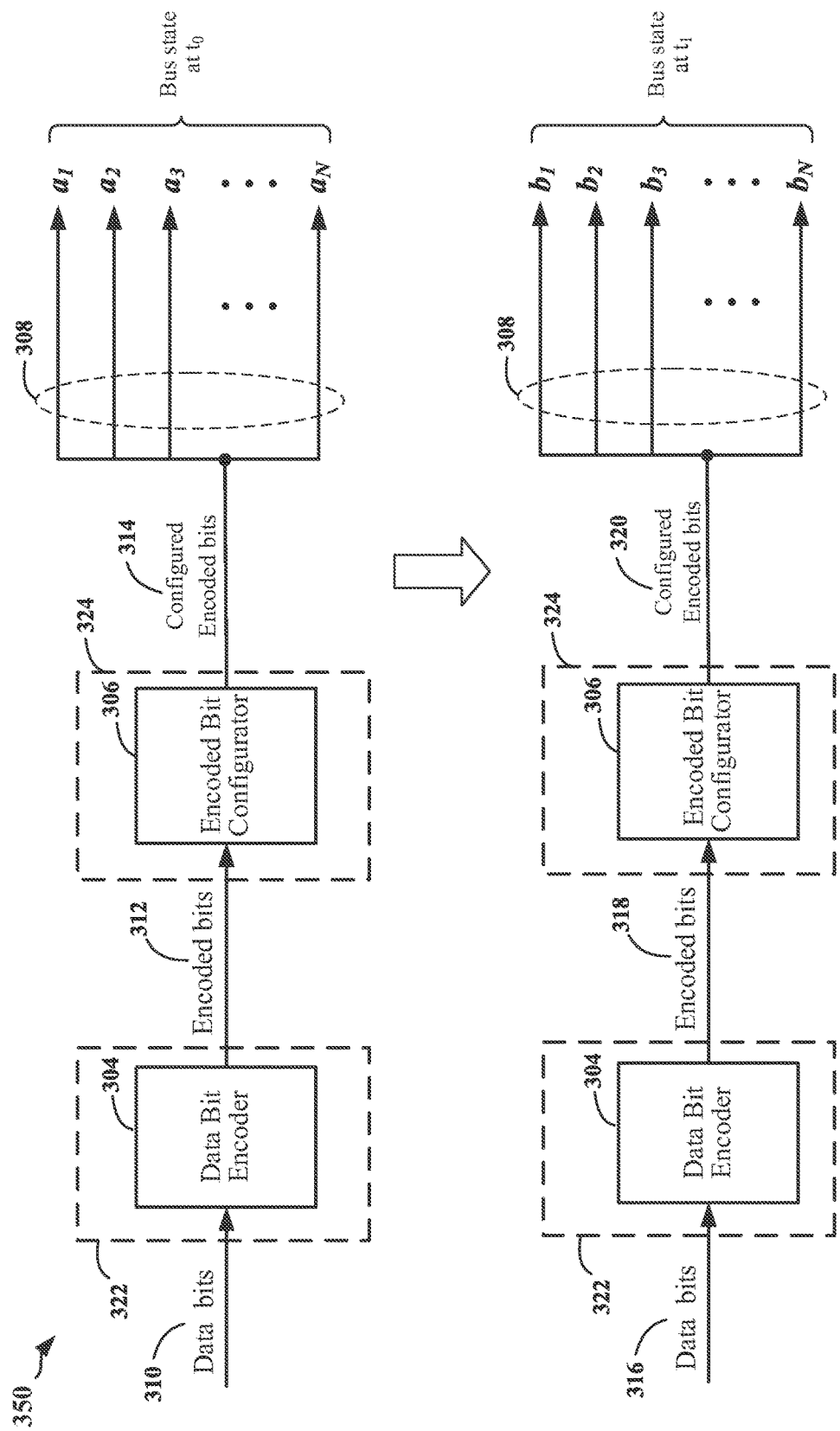
FIG. 3B illustrates an exemplary device for transmitting encoded bits over a bus in accordance with various aspects of the disclosure.

While the data bit encoder 304 and the encoded bit configurator 306 illustrated in FIG. 3A may be implemented in a single device or module (e.g., a transceiver), it should be understood that the data bit encoder 304 and/or the encoded bit configurator 306 may be implemented in separate components or modules of an apparatus (e.g., apparatus 200 of FIG. 2). In such a configuration, the data bit encoder 304 and the encoded bit configurator 306 may be communicatively coupled to one another. For example, FIG. 3B is a diagram 350 illustrating a configuration in which the data bit encoder 304 is implemented in a processing circuit 322 and the encoded bit configurator 306 is implemented in a transceiver 324. For example, the processing circuit 322 may correspond to the processing circuit 206 in FIG. 2, and the transceiver 324 may correspond to the transceiver 210 in FIG. 2.

Embedding Information while Satisfying Crosstalk Avoidance Constraints

In the aspects described herein, $a_n$ and $b_n$ may represent the past and current bus inputs on line n of the bus 308, and $s_n$ may represent a forcing variable that indicates whether a bit on line n is a forced bit. For example, when $s_n=1$, the value $b_n$ is configured to carry a data bit, whereas when $s_n=0$, $b_n$ is configured to be a forced bit and carries no data (none of the data bits 316) in order to satisfy crosstalk avoidance constraints. The values of $s_n$ may be determined directly from the past bus state $a_1, a_2, \ldots, a_{n-1}$, the present bus state $b_1, b_2, \ldots, b_{n-1}$, and the crosstalk avoidance constraints. A value $p_n$ may represent the partial parity of the present bus state up to line n of the bus 308 and may be defined as $p_n = b_1 \oplus b_2 \oplus \ldots \oplus b_n$, where the symbol $\oplus$ denotes a logical XOR operation. A value $c_n$ may represent a bit indicating whether a transition exists up to line n of the bus 308 and may be defined as $c_n = (a_1 \oplus b_1) | (a_2 \oplus b_2) | \ldots | (a_n \oplus b_n)$, where the symbol | denotes a logical OR operation. For example, $c_n=1$ when there is a transition on the bus 308 up to line n of the bus 308, and $c_n=0$ when no transition exists on the bus 308 up to line n of the bus 308. It should be understood that in the aspects described herein, $n \leq N$. The aspects described herein include exemplary approaches for efficiently embedding conditional information in a bus transmission using dynamic shielding. Such exemplary approaches include clock information embedding, parity information embedding, joint clock information and parity information embedding, and robust joint clock information and parity information embedding. In each approach, the embedding of information is guaranteed to satisfy the crosstalk avoidance constraints. Such exemplary approaches are described for a bus having N wires.

Embedding Clock Information

In an aspect, data bits to be transmitted may be encoded to avoid crosstalk on a bus (e.g., bus 308) while being embedded with clock information (e.g., a reference clock signal). In the aspects described herein, the embedding of clock information may be achieved by ensuring that each transmission on the bus (e.g., bus 308) includes at least one bit transition (e.g., a transition of '0' to '1' on a line of the bus 308 or a transition of '1' to '0' on a line of the bus 308) with respect to a preceding transmission on the bus. For example, data bits (e.g., data bits 316) to be transmitted on a bus (e.g., bus 308) may be sequentially encoded using crosstalk avoidance constraints and may be represented by the sequence of bits $b_1, b_2, \ldots, b_{N-1}$. In such example, clock information may be embedded by applying the following two constraints:

1. If $c_{N-1}=1$, then encode $b_N$ by applying crosstalk avoidance constraints
2. If $c_{N-1}=0$, then force $b_N=\overline{a}_N$ where the operator "‾" represents a logical NOT operation. For example, the bit $\overline{a}_N$ represents the result of a logical NOT operation performed on the bit $a_N$. Therefore, if $c_{N-1}=1$, then $b_N$ may be encoded by applying crosstalk avoidance constraints. However, if $c_{N-1}=0$, then the value of $b_N$ may be forced to be the inverse of value of $a_n$ (e.g., $b_N=\overline{a}_N$) to embed the clock information.

Embedding Parity Information

In an aspect, data bits to be transmitted may be encoded to avoid crosstalk on a bus (e.g., bus 308) while being embedded with parity information. In the aspects described herein, the embedding of parity information may be achieved by ensuring that the parity of each bus state is even. In other aspects, the parity of each bus state may be configured to be odd.

Figure 4:
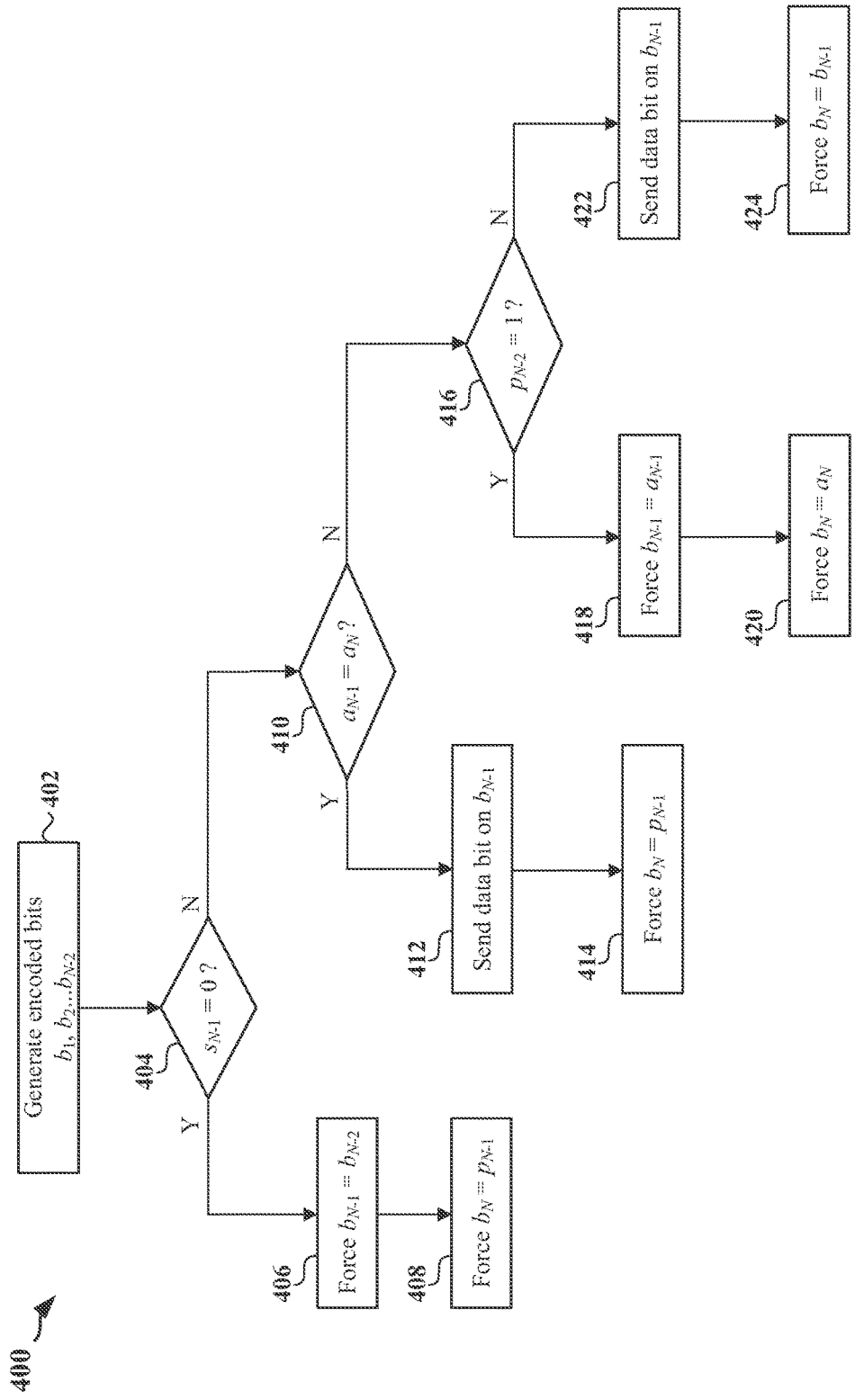
FIG. 4 is an exemplary algorithm for embedding parity information while ensuring that crosstalk-inducing bit transitions are avoided in accordance with various aspects of the disclosure.

FIG. 4 is an exemplary algorithm 400 for embedding parity information while ensuring that crosstalk-inducing bit transitions are avoided. In an aspect, the algorithm 400 may be performed by the electronic device 302 (e.g., the encoded bit configurator 306 of the electronic device 302). For example, at 402, the electronic device 302 may generate (or receive) encoded bits (e.g., $b_1, b_2, \ldots, b_{N-2}$) to be transmitted on a bus having N wires. Such encoded bits may be generated by sequentially encoding data bits using crosstalk avoidance constraints. As shown in FIG. 4, at 404, the electronic device 302 may determine the value of $s_{N-1}$. If $s_{N-1}=0$ (e.g., indicating that bit $b_{N-1}$ is a forced bit), then at 406, the value of $b_{N-1}$ may be forced to be the value of $b_{N-2}$ (e.g., $b_{N-1}=b_{N-2}$) to satisfy the crosstalk avoidance constraint. At 408, the value of $b_N$ may be forced to be the value of $p_{N-1}$ (e.g., $b_N=p_{N-1}$) to ensure even parity. If $s_{N-1}=1$, then at 410, the electronic device 302 may determine whether $a_{N-1}=a_N$. If $a_{N-1}=a_N$, then at 412, the electronic device 302 may send a data bit on $b_{N-1}$. At 414, the electronic device 302 may force the value of $b_N$ to be the value of $p_{N-1}$ (e.g., $b_N=p_{N-1}$). If $a_{N-1}\neq a_N$, then at 416, the electronic device 302 may determine whether $p_{N-2}=1$. If $p_{N-2}=1$, then at 418, the electronic device 302 may force the value of $b_{N-1}$ to be the value of $a_{N-1}$ (e.g., $b_{N-1}=a_{N-1}$). At 420, the electronic device 302 may force the value of $b_N$ to be the value of $a_N$ (e.g., $b_N=a_N$). If $p_{N-2}=0$, then at 422, the electronic device 302 may send a data bit on $b_{N-1}$. At 424, the electronic device 302 may force the value of $b_N$ to be the value of $b_{N-1}$ (e.g., $b_N=b_{N-1}$). Therefore, in this exemplary even parity embedding approach, an even parity may be embedded which ensures that the parity of the bus state $b_1, b_2, \ldots, b_N$ is even while maintaining crosstalk avoidance. It should be understood that in other aspects, the even parity embedding approach may be modified for embedding an odd parity.

Embedding Clock information and Parity information

In an aspect, data bits to be transmitted on a bus (e.g., bus 308) may be encoded to avoid crosstalk while being embedded with clock and parity information. For example, the data bits to be transmitted may be encoded to avoid crosstalk, while guaranteeing even parity for the transmission and guaranteeing at least one bit transition with respect to a preceding transmission. For example, data bits (e.g., data bits 316) to be transmitted during a clock cycle on a bus (e.g., bus 308) may be sequentially encoded using crosstalk avoidance constraints. In such example, each set of encoded bits for each transmission may be configured to include an even parity or an odd parity in an alternating manner using the previously discussed parity embedding approach. Such an approach will ensure that there is at least one bit transition on the bus during every clock cycle. It should be noted that since it will be known whether an even or odd parity bit is expected for a particular clock cycle, the embedded parity bit can still be used for error detection.

Robust Embedding of Clock Information and Parity information

In the previously described joint clock and parity embedding approach, a single error on the bus may lead to a clock cycle that does not include any bit transitions on the bus. Therefore, a single error, although detectable in a timed system, may result in a loss of synchronization. To avoid such a situation, data bits to be transmitted on a bus may be encoded using a robust clock information and parity information embedding approach. In an aspect, the robust clock information and parity information embedding approach may ensure that a bit transition on the bus will occur despite even a single bit transmission error. In an aspect, the robust clock information and parity information embedding approach may embed an even parity for each group of encoded bits to be transmitted on the bus.

Figure 5:
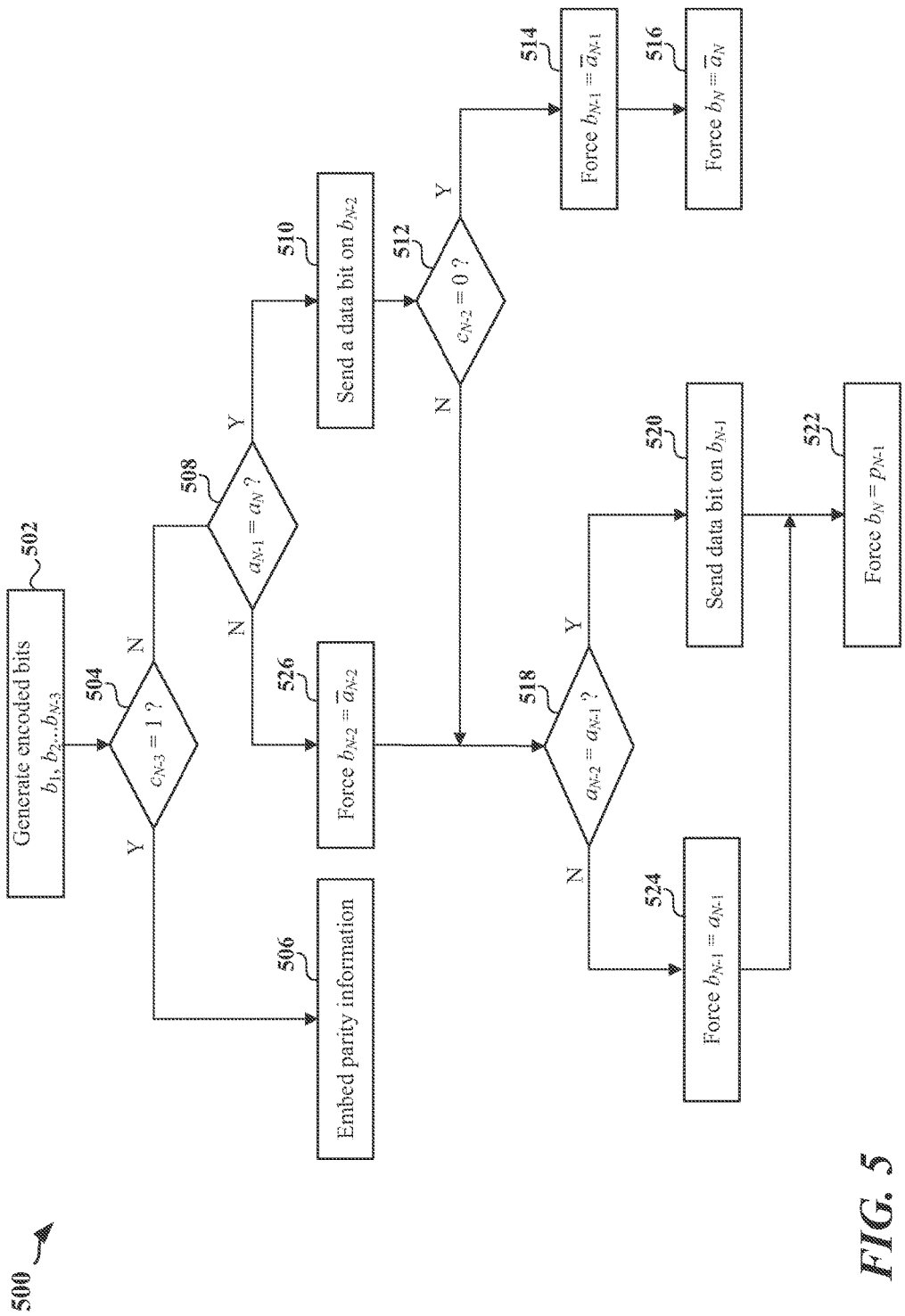
FIG. 5 is an exemplary algorithm for embedding clock information and parity information while ensuring that crosstalk-inducing bit transitions are avoided in accordance with various aspects of the disclosure.

In an aspect, data bits to be transmitted may be encoded to avoid crosstalk while being embedded with clock information and parity information. For example, the data bits to be transmitted may be encoded to avoid crosstalk, while guaranteeing even parity for the transmission and guaranteeing at least one bit transition with respect to a preceding transmission. FIG. 5 is an exemplary algorithm 500 for embedding clock information and parity information while ensuring that crosstalk-inducing hit transitions are avoided. In an aspect, the algorithm 500 may be performed by the electronic device 302 (e.g., the encoded bit configurator 306 of the electronic device 302). For example, at 502, the electronic device 302 may generate (or receive) encoded bits (e.g., $b_1, b_2, \ldots, b_{N-3}$) to be transmitted on a bus (e.g., bus 308) having N wires. Such encoded bits may be generated by sequentially encoding data bits using crosstalk avoidance constraints.

As shown in FIG. 5, at 504, the electronic device 302 may determine the value of a transition indicator bit $c_{N-3}$. For example, to determine the value of $c_{N-3}$, the electronic device may compare encoded bits $a_1, a_2, \ldots, a_{N-3}$ (e.g., the state of the bus at $t_0$) to corresponding encoded bits $b_1, b_2, \ldots, b_{N-3}$ that are to be transmitted on the bus at $t_1$. In such example, if the electronic device 302 determines any bit transitions, $c_{N-3}$ may be set to '1'. Otherwise, if no bit transitions are determined, $c_{N-3}$ may be set to '0'. Therefore, with reference to FIG. 5, if $c_{N-3}=1$, then at 506, the electronic device 302 may proceed to embed parity information. For example, the electronic device 302 may proceed to embed parity information by applying the algorithm 400 discussed with respect to FIG. 4. Otherwise, if $c_{N-3}=0$, then at 508, the electronic device 302 may determine whether $a_{N-1}=a_N$. If $a_{N-1} \neq a_N$, then at 426, the electronic device 302 may force the value of $b_{N-2}$ to be the value of $\bar{a}_{N-2}$ (e.g., $b_{N-2}=\bar{a}_{N-2}$) to create a bit transition on the bus. At 518, the electronic device 302 may determine whether $a_{N-2}=a_{N-1}$. If $a_{N-2} \neq a_{N-1}$, that at 524, the electronic device 302 may three $b_{N-1}$ to be the value of $a_{N-1}$ (e.g., $b_{N-1}=a_{N-1}$). At 522, the electronic device 302 may force the value of $b_N$ to be the value of $p_{N-1}$ (e.g., $b_N=p_{N-1}$). If $a_{N-2}=a_{N-1}$, then at 520, the electronic device 302 may transmit a data bit on $b_{N-1}$. At 522, the electronic device 302 may force the value of $b_N$ to be the value of $p_{N-1}$ (e.g., $b_N=p_{N-1}$).

If $a_{N-1}=a_N$ at 508, then at 510, the electronic device 302 may send a data bit on $b_{N-2}$. At 512, the electronic device 302 may then determine the value of transition indicator bit $c_{N-2}$. For example, to determine the value of $c_{N-2}$, the electronic device 302 may compare the encoded bits $a_1, a_2, \ldots, a_{N-2}$ (e.g., the state of the bus up to $a_{N-2}$ at $t_0$) to the corresponding encoded bits $b_1, b_2, \ldots, b_{N-2}$ that are to be transmitted on the bus at $t_1$. In such example, if the electronic device 302 determines any bit transitions, $c_{N-2}$ may be set to '1'. Otherwise, if no hit transitions are determined, $c_{N-2}$ may be set to '0'. If $c_{N-2}=1$, the electronic device 302 proceeds to the decision at 518. Otherwise, if $c_{N-2}=0$, then at 514, the electronic device 302 may force the value of $b_{N-1}$ to be the value of $\bar{a}_{N-1}$ (e.g., $b_{N-1}=\bar{a}_{N-1}$). At 516, the electronic device may force the value of $b_N$ to be the value of $\bar{a}_N$ (e.g., $b_N=\bar{a}_N$).

In an aspect, an apparatus configured to perform any of the previously discussed approaches may be implemented using a combinational circuit. In such aspect, the encoding operations (e.g., application of the previously described conditions) may be performed in a single clock cycle. It should be understood that the aspects discussed herein may also be used for other crosstalk avoidance constraints than those discussed herein.

Figure 6:
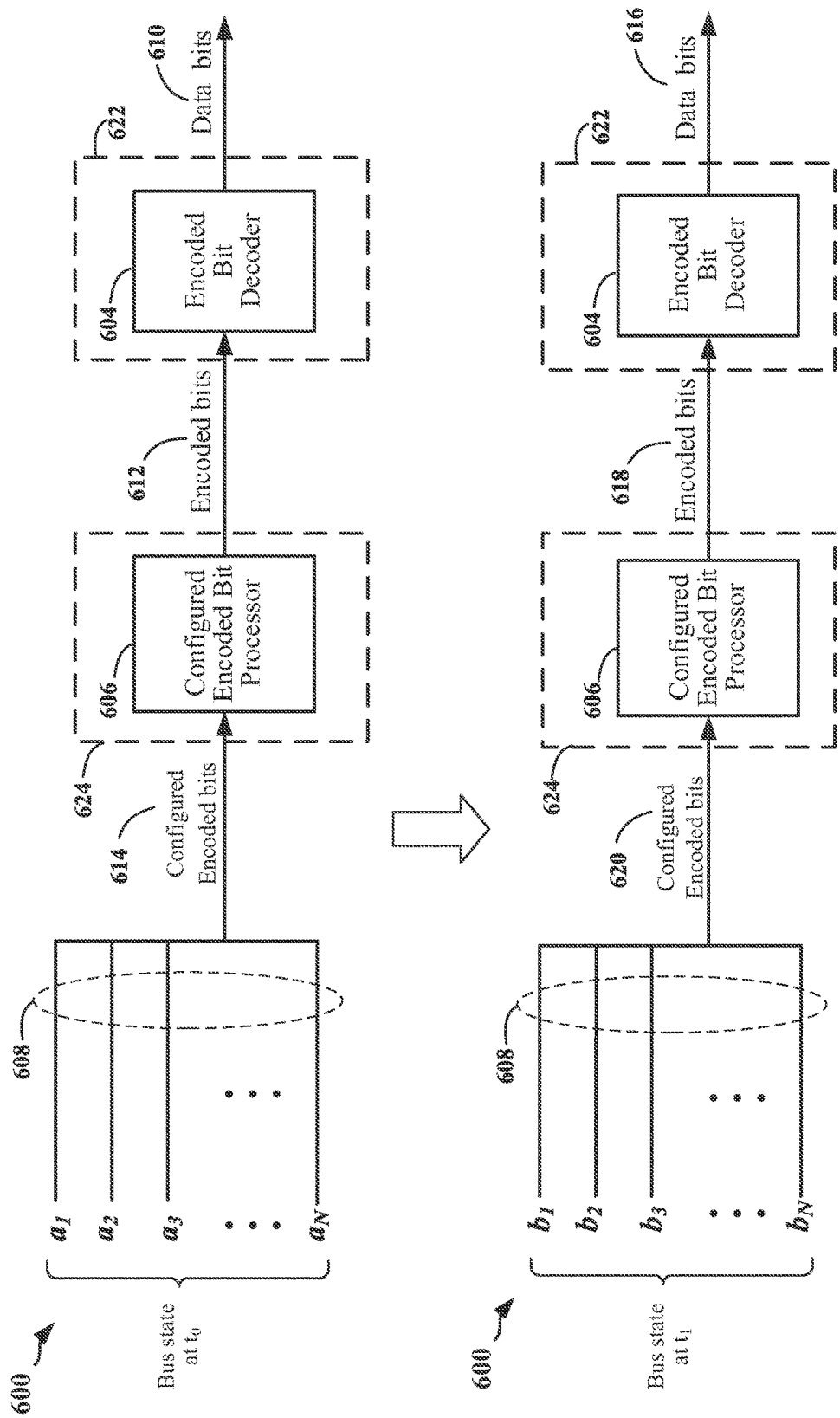
FIG. 6 is a diagram illustrating an electronic device configured to decode transmissions received over a bus in accordance with various aspects of the disclosure.

FIG. 6 is a diagram illustrating an electronic device 600 configured to decode transmissions received over a bus in accordance with various aspects of the disclosure. As shown in FIG. 6, electronic device 600 includes a configured encoded hit processor 505 and encoded bit decoder 604. In the aspect of FIG. 6, the configured encoded hit processor 606 is implemented in a component 624 and the encoded hit decoder 604 is implemented in a component 624. In such aspect, the configured encoded bit processor 606 is communicatively coupled to the encoded bit decoder 504. For example, component 624 may be a transceiver (e.g., transceiver 210 in FIG. 2) and the component 622 may be a processor (e.g., processing circuit 206). In other aspects, the configured encoded bit processor 606 and the encoded bit decoder 604 may be collocated in a single component, such as the transceiver 210 in FIG. 2.

In an aspect, the electronic device 600 may be configured to receive and decode configured encoded bits that are similar to the configured encoded bits 314 or 320 previously described with respect to FIG. 3 (including FIGS. 3A and 3B). For example, with reference to FIG. 6, the configured encoded bit processor 606 may receive a first group of configured encoded bits 614 (e.g., bits $a_1, a_2, \ldots, a_N$) over the bus 608 at a time $t_0$ (e.g., during a first clock cycle) and may provide encoded bits 612 to the encoded bit decoder 604. The encoded bits 612 may represent data bits that are encoded using crosstalk avoidance constraints as previously discussed. The encoded hit decoder 604 may then decode the encoded bits 612 based on the crosstalk avoidance constraints to recover the data bits 610.

The configured encoded bit processor 606 may subsequently receive a second group of configured encoded bits 620 (e.g., bits $b_1, b_2, \ldots, b_N$) over the bus 608 at a time $t_1$ (e.g., during a second clock cycle), in an aspect, the configured encoded bit processor 606 may determine whether parity information embedded in the second group of configured encoded bits 620 is the expected parity information (e.g., even parity). If the parity information embedded in the second group of configured encoded bits 620 is not the expected parity information, the electronic device 600 may determine that the transmission received at time $t_1$ is erroneous and may request a retransmission. Otherwise, the electronic device 600 may consider the transmission received at time $t_1$ to be correct. If the transmission received at time $t_1$ is considered to be correct, the configured encoded bit processor 606 may apply an algorithm (e.g., the previously described algorithm in FIG. 4 or FIG. 5) to identify the forced bits in the second group of configured encoded bits 620. The configured encoded bit processor 606 may then discard the identified forced bits to generate the encoded bits 618. The encoded bits 618 may then be provided to the encoded bit decoder 604, which may decode the encoded bits 618 based on the crosstalk avoidance constraints to recover the data bits 616.

Therefore, the electronic device 600 may determine, given the past state of the bus 608, whether a bit present on a particular wire of the bus is a data bit or a forced bit. In an aspect, this operation can also be implemented using a combinational circuit. Using this classification of bits into data bits and forced bits, allows the electronic device 600 to discard the forced bits and recover the original data bits (e.g., data hits 616).

The aspects described herein provide several advantages. For example, information may be embedded into a set of encoded bits to be transmitted over a bus when such embedding is determined to be necessary. For example, with respect to the clock embedding approach, a clock signal is transmitted if no hit transitions have already occurred on the bus. As another example, with respect to the parity embedding approach, an explicit parity bit is embedded when the parity of the encoded bits to be transmitted on the bus is not already even. This conditional embedding uses fewer bus wires than conventional embedding approaches. Moreover, the aspects described herein dynamically shield the embedded information by adding "shielding" (e.g., by duplicating values transmitted on the bus) when it is actually required. Such dynamic shielding uses fewer bus wires than conventional static shielding approaches.

Exemplary Encoding Apparatus and Method Thereon

Figure 7:
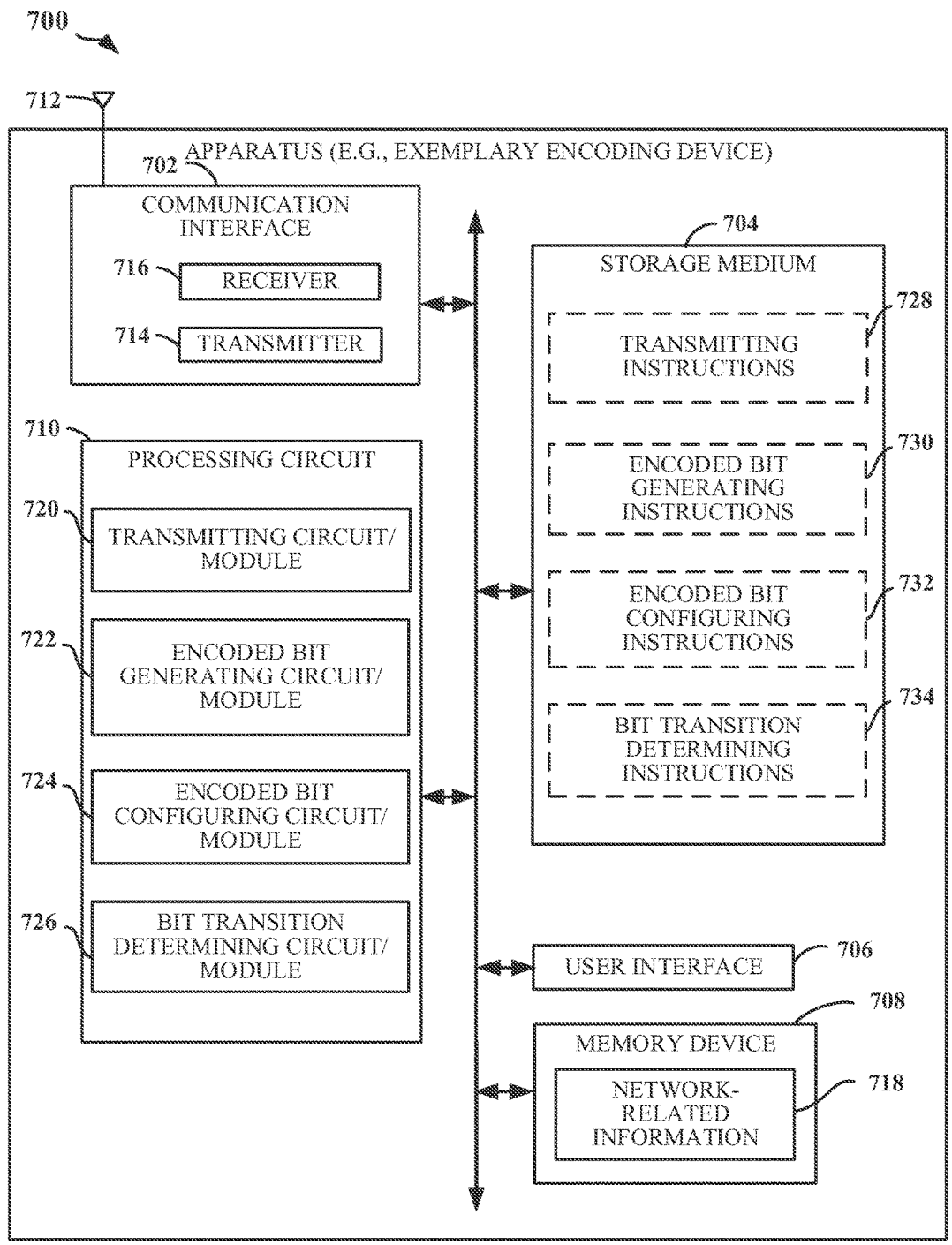
FIG. 7 is an illustration of an apparatus configured to transmit encoded bits over a bus by conditionally embedding dynamically shielded information according to one or more aspects of the disclosure.

FIG. 7 is an illustration of an apparatus 700 configured to transmit encoded bits over a bus by conditionally embedding dynamically shielded information according to one or more aspects of the disclosure (e.g., aspects related to the methods of FIGS. 8 and/or 9 described below). The apparatus 700 includes a communication interface (e.g., at least one transceiver) 702, a storage medium 704, a user interface 706, a memory device 708, and a processing circuit 710.

These components can be coupled to and/or placed in electrical communication with one another via a signaling bus or other suitable component, represented generally by the connection lines in FIG. 7. The signaling bus may include any number of interconnecting buses and bridges depending on the specific application of the processing circuit 710 and the overall design constraints. The signaling bus links together various circuits such that each of the communication interface 702, the storage medium 704, the user interface 706, and the memory device 708 are coupled to and/or in electrical communication with the processing circuit 710. The signaling bus may also link various other circuits (not shown) such as timing sources, peripherals, voltage regulators, and power management circuits, which are well known in the art, and therefore, will not be described any further.

The communication interface 702 may be adapted to facilitate wireless communication of the apparatus 700. For example, the communication interface 702 may include circuitry and/or code (e.g., instructions) adapted to facilitate the communication of information bi-directionally with respect to one or more communication devices in a network. The communication interface 702 may be coupled to one or more antennas 712 for wireless communication within a wireless communication system. The communication interface 702 can be configured with one or more standalone receivers and/or transmitters, as well as one or more transceivers. In the illustrated example, the communication interface 702 includes a transmitter 714 and a receiver 716.

The memory device 708 may represent one or more memory devices. As indicated the memory device 708 may maintain network-related information/along with other information used by the apparatus 700. In some implementations, the memory device 708 and the storage medium 704 are implemented as a common memory component. The memory device 708 may also be used for storing data that is manipulated by the processing circuit 710 or some other component of the apparatus 700.

The storage medium 704 may represent one or more computer-readable, machine-readable, and/or processor-readable devices for storing code, such as processor executable code or instructions (e.g., software, firmware), electronic data, databases, or other digital information. The storage medium 704 may also be used for storing data that is manipulated by the processing circuit 710 when executing code. The storage medium 704 may be any available media that can be accessed by a general purpose or special purpose processor, including portable or fixed storage devices, optical storage devices, and various other mediums capable of storing, containing or carrying code.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Code and/or instructions stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols.

The processing circuit 710 is generally adapted for processing, including the execution of such code/instructions stored on the storage medium 704. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired code provided by appropriate media in at least one example. For example, the processing circuit 710 may be implemented as one or more processors, one or more controllers, and/or other structure configured to execute executable code. Examples of the processing circuit 710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. As used herein, the term "adapted" in relation to the processing circuit 710 may refer to the processing circuit 710 being one or more of configured, employed, implemented, and/or programmed to perform a particular process, function, operation and/or routine according to various features described herein.

According to at least one example of the apparatus 700, the processing circuit 710 may include one or more of a transmitting circuit/module 720, a encoded bit generating circuit/module 722, an encoded bit configuring circuit/module 724, and a bit transition determining circuit/module 726 that are adapted to perform any or all of the features, processes, functions, operations and/or routines described herein (e.g., features, processes, functions, operations and/or routines described with respect to FIG. 5 and/or 6).

The transmitting circuit/module 720 may include circuitry and/or instructions (e.g., transmitting instructions 728 stored on the storage medium 704) adapted to perform several functions relating to, for example, transmitting a first group of encoded bits over a bus and/or transmitting a second group of encoded bits over the bus.

The encoded bit generating circuit/module 722 may include circuitry and/or instructions (e.g., encoded bit generating instructions 730 stored on the storage medium 704) adapted to perform several functions relating to, for example, generating a second group of encoded bits to be transmitted over a bus, where a first subset of the second group of encoded bits are encoded to avoid crosstalk-inducing bit transitions on adjacent lines of the bus.

The encoded bit configuring circuit/module 724 may include circuitry and/or instructions (e.g., encoded bit configuring instructions 732 stored on the storage medium 704) adapted to perform several functions relating to, for example, configuring one or more encoded bits of a second subset of the second group of encoded bits to ensure that the second group of encoded bits includes parity information and to ensure that crosstalk-inducing bit transitions on the second group of encoded bits are avoided, and/or configuring one or more encoded bits of a second subset of the second group of encoded bits to ensure at least one bit transition with respect to the first group of encoded bits and to ensure that crosstalk-inducing bit transitions in the second group of encoded bits are avoided.

The bit transition determining circuit/module 726 may include circuitry and/or instructions (e.g., bit transition determining instructions 734 stored on the storage medium 704) adapted to perform several functions relating to, for example, determining whether the first subset of the second group of encoded bits includes at least one bit transition with respect to the first group of encoded bits.

As mentioned above, instructions stored by the storage medium 704, when executed by the processing circuit 710, causes the processing circuit 710 to perform one or more of the various functions and/or process operations described herein. For example, the storage medium 704 may include one or more of the transmitting instructions 728, encoded bit generating instructions 730, encoded bit configuring instructions 732, and bit transition determining instructions 734.

Figure 8:
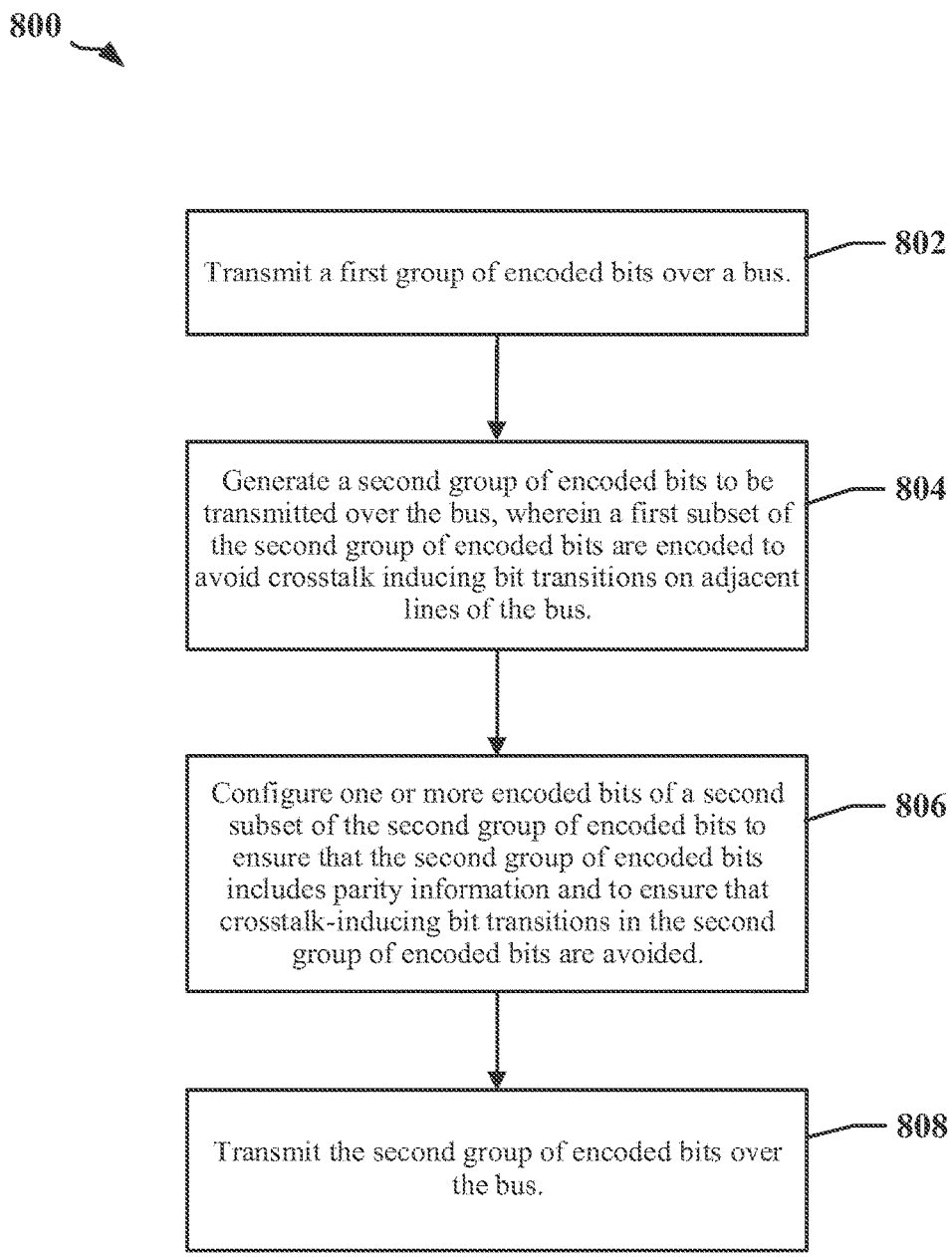
FIG. 8 is a flowchart illustrating a method for conditional embedding of dynamically shielded information on a bus in accordance with various aspects of the disclosure.

FIG. 8 is a flowchart 800 illustrating a method for conditional embedding of dynamically shielded information on a bus in accordance with various aspects of the disclosure. The method may be performed by an electronic device (e.g., electronic device 302 of FIG. 3 or apparatus 700 of FIG. 7).

The electronic device transmits a first group of encoded bits over a bus 802. The electronic device generates a second group of encoded bits to be transmitted over the bus, where a first subset of the second group of encoded bits are encoded to avoid crosstalk-inducing bit transitions on adjacent lines of the bus 804. The electronic device configures one or more encoded bits of a second subset of the second group of encoded bits to ensure that the second group of encoded bits includes parity information and to ensure that crosstalk-inducing bit transitions in the second group of encoded bits are avoided 806. The electronic device transmits the second group of encoded bits over the bus 808.

Figure 9:
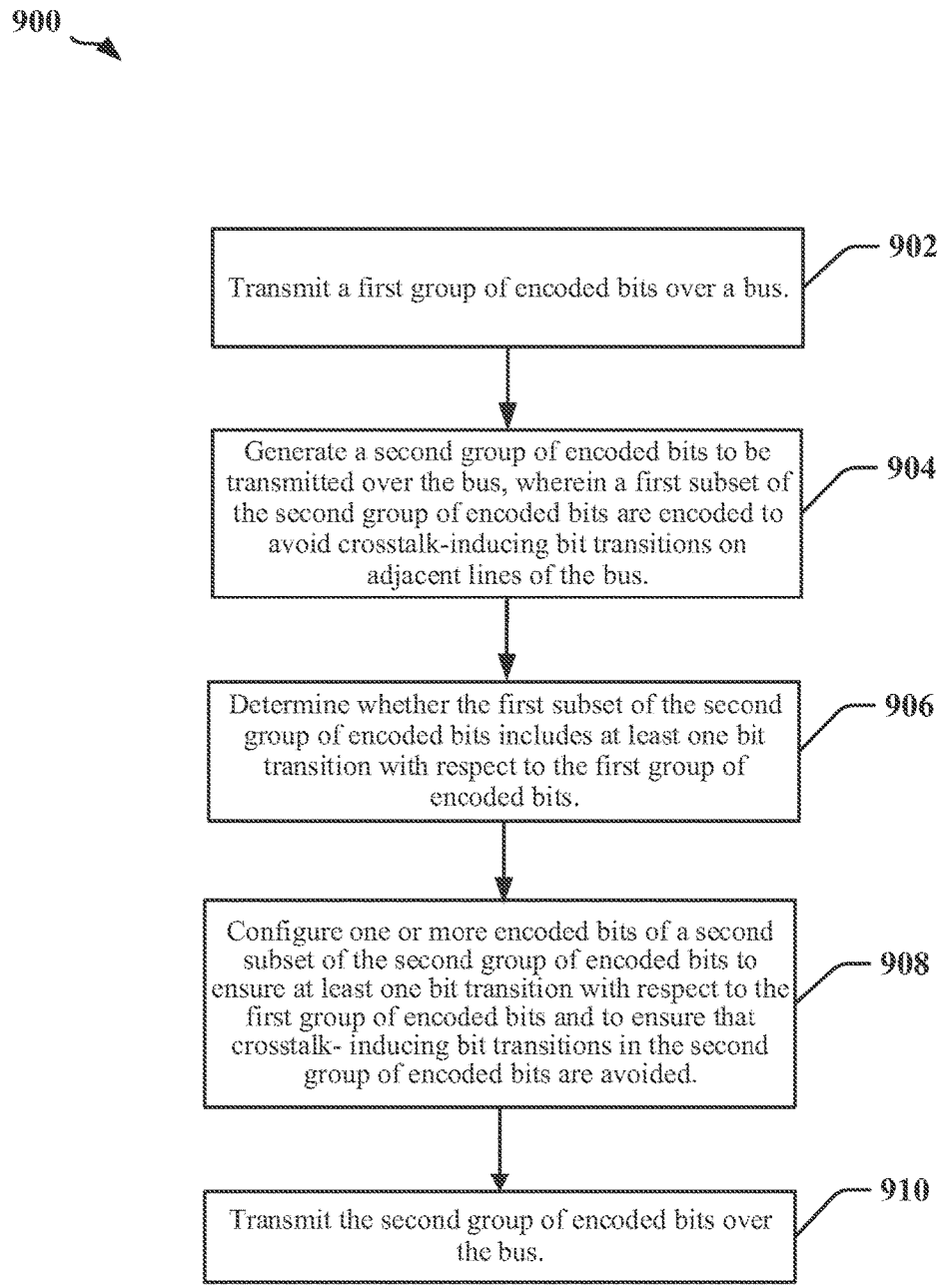
FIG. 9 is a flowchart illustrating a method for conditional embedding of dynamically shielded information on a bus in accordance with various aspects of the disclosure.

FIG. 9 is a flowchart 900 illustrating a method for conditional embedding of dynamically shielded information on a bus in accordance with various aspects of the disclosure. The method may be performed by an electronic device (e.g., electronic device 302 of FIG. 3 or apparatus 700 of FIG. 7).

The electronic device transmits a first group of bits over a bus 902. The electronic device generates a second group of encoded bits to be transmitted over the bus, where a first subset of the second group of encoded bits are encoded to avoid crosstalk-inducing bit transitions on adjacent lines of the bus 904. The electronic device determines whether the first subset of the second group of encoded bits includes at least one bit transition with respect to the first group of encoded bits 906. The electronic device configures one or more encoded bits of a second subset of the second group of encoded bits to ensure at least one bit transition with respect to the first group of encoded bits and to ensure that crosstalk-inducing bit transitions in the second group of encoded bits are avoided 908. The electronic device transmits the second group of encoded bits over the bus 910.

Exemplary Decoding Apparatus and Method Thereon

Figure 10:
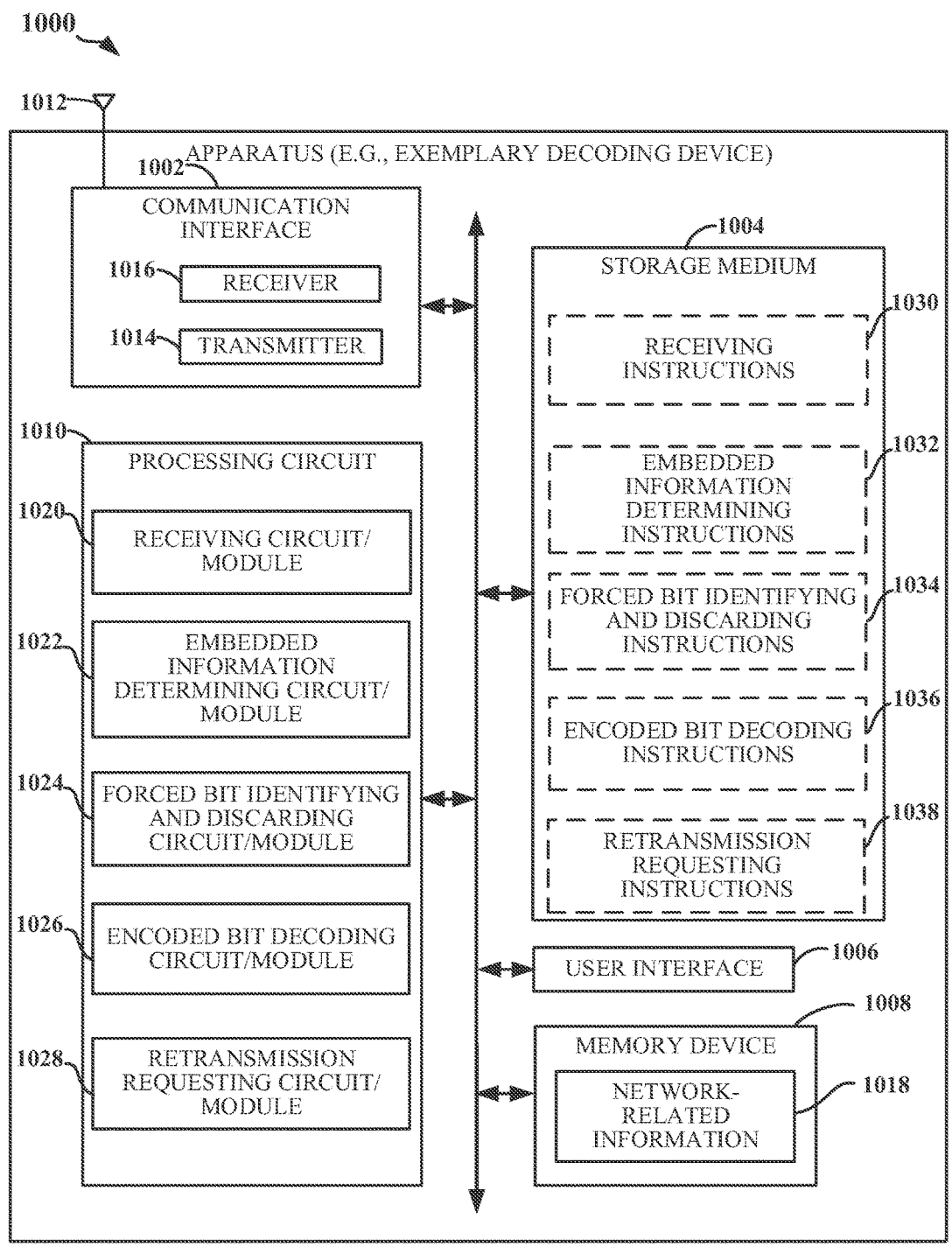
FIG. 10 is an illustration of an apparatus configured to receive encoded bits including conditionally embedded dynamically shielded information over a bus according to one or more aspects of the disclosure.

FIG. 10 is an illustration of an apparatus 1000 configured to receive encoded bits over a bus according to one or more aspects of the disclosure (e.g., aspects related to the method of FIG. 11 described below). The apparatus 1000 includes a communication interface at least one transceiver) 1002, a storage medium 1004, a user interface 1006, a memory device 1008, and a processing circuit 1010.

These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 may be adapted to facilitate wireless communication of the apparatus 1000. For example, the communication interface 1002 may include circuitry and/or code (e.g., instructions) adapted to facilitate the communication of information bi-directionally with respect to one or more communication devices in a network. The communication interface 1002 may be coupled to one or more antennas 1012 for wireless communication within a wireless communication system. The communication interface 1002 can be configured with one or more standalone receivers and/or transmitters, as well as one or more transceivers. In the illustrated example, the communication interface 1002 includes a transmitter 1014 and a receiver 1016.

The memory device 1008 may represent one or more memory devices. As indicated, the memory device 1008 may maintain network-related information/along with other information used by the apparatus 1000. In some implementations, the memory device 1008 and the storage medium 1004 are implemented as a common memory component.

The memory device 1008 may also be used for storing data that is manipulated by the processing circuit 1010 or some other component of the apparatus 1000.

The storage medium 1004 may represent one or more computer-readable, machine-readable, and/or processor-readable devices for storing code, such as processor executable code or instructions (e.g., software, firmware), electronic data, databases, or other digital information. The storage medium 1004 may also be used for storing data that is manipulated by the processing circuit 1010 when executing code. The storage medium 1004 may be any available media that can be accessed by a general purpose or special purpose processor, including portable or fixed storage devices, optical storage devices, and various other mediums capable of storing, containing or carrying code.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory tangible) storage medium.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the apparatus 1000, external to the apparatus 1000, distributed across multiple entities, etc.).

Code and/or instructions stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols.

The processing circuit 1010 is generally adapted for processing, including the execution of such code/instructions stored on the storage medium 1004. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired code provided by appropriate media in at least one example. For example, the processing circuit 1010 may be implemented as one or more processors, one or more controllers, and/or other structure configured to execute executable code. Examples of the processing circuit 1010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the apparatuses described herein. As used herein, the term "adapted" in relation to the processing circuit 1010 may refer to the processing circuit 1010 being one or more of configured, employed, implemented, and/or programmed to perform a particular process, function, operation and/or routine according to various features described herein.

Figure 11:
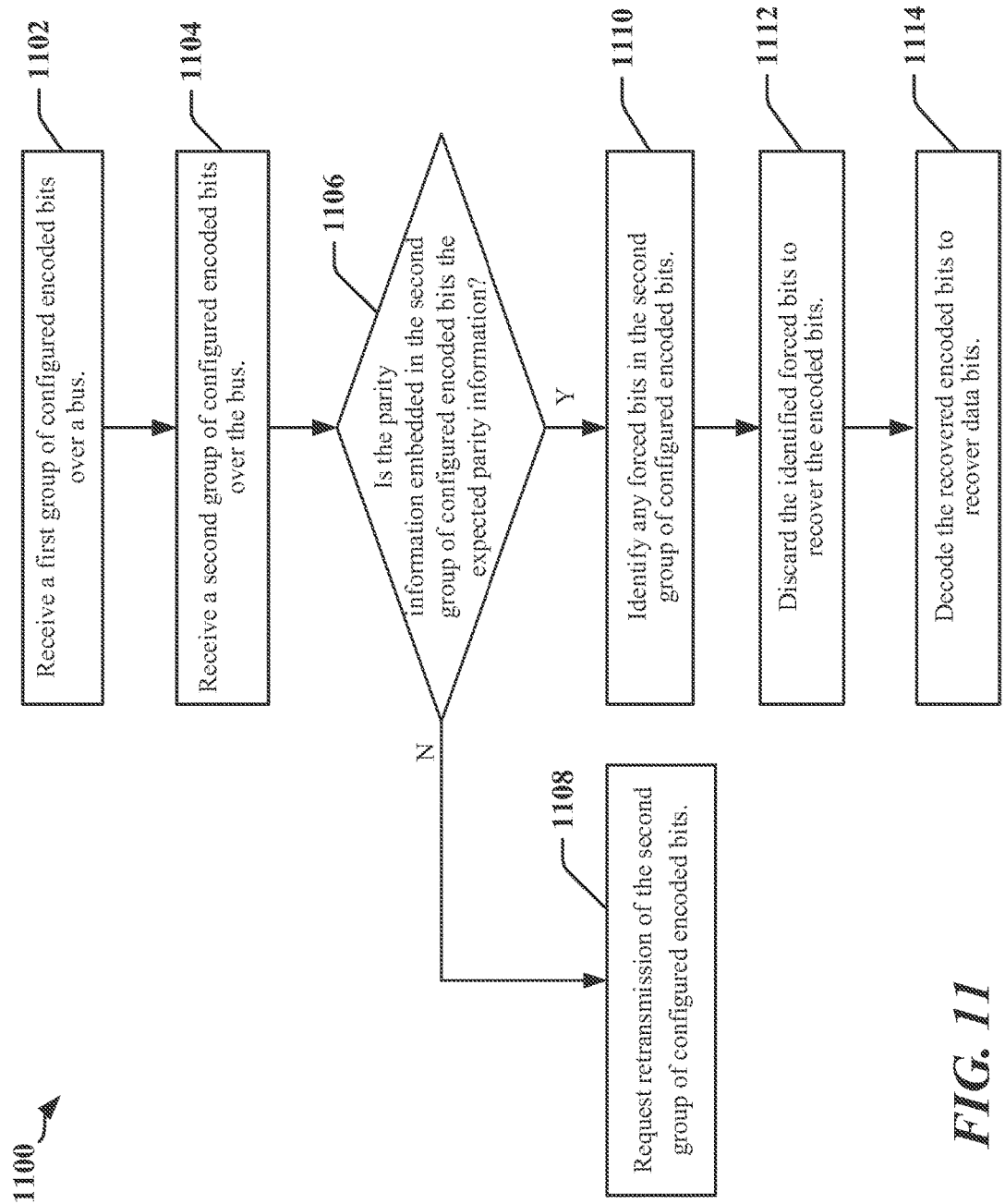
FIG. 11 is a flowchart illustrating a method for receiving encoded bits including conditionally embedded dynamically shielded information on a bus in accordance with various aspects of the disclosure.

According to at least one example of the apparatus 1000, the processing circuit 1010 may include one or more of a receiving circuit/module 1020, an embedded information determining circuit/module 1022, a forced bit identifying and discarding module 1024, an encoded hit decoding circuit/module 1026, and a retransmission requesting circuit/module 1028 that are adapted to perform any or all of the features, processes, functions, operations and/or routines described herein (e.g., features, processes, functions, operations and/or routines described with respect to FIG. 11).

The receiving circuit/module 1020 may include circuitry and/or instructions (e.g., receiving instructions 1030 stored on the storage medium 1004) adapted to perform several functions relating to, for example, receiving a first group of configured encoded bits over a bus and/or receiving a second group of configured encoded bits over the bus.

The embedded information determining circuit/module 1022 may include circuitry and/or instructions (e.g., embedded information determining instructions 1032 stored on the storage medium 1004) adapted to perform several functions relating to, for example, determining whether the parity information embedded in the second group of configured encoded bits is the expected parity information and/or determining clock information embedded in the second group of configured encoded bits.

The forced bit identifying and discarding circuit/module 1024 may include circuitry and/or instructions (e.g., forced bit identifying and discarding instructions 1034 stored on the storage medium 1004) adapted to perform several functions relating to, for example, identifying any forced bits in the second group of configured encoded bits and/or discarding the identified forced bits to recover the encoded bits.

The encoded bit decoding circuit/module 1026 may include circuitry and/or instructions (e.g., encoded bit decoding instructions 1036 stored on the storage medium 1004) adapted to perform several functions relating to, for example, decoding the recovered encoded bits to recover data bits.

The retransmission requesting circuit/module 1028 may include circuitry and/or instructions (e.g., retransmission requesting instructions 1038 stored on the storage medium 1004) adapted to perform several functions relating to, for example, requesting retransmission of the second group of configured encoded bits.

As mentioned above, instructions stored by the storage medium 1004, when executed by the processing circuit 1010, causes the processing circuit 1010 to perform one or more of the various functions and/or process operations described herein. For example, the storage medium 1004 may include one or more of the receiving instructions 1030, embedded information determining instructions 1032, forced bit identifying and discarding instructions 1034, encoded bit decoding instructions 1036, and retransmission requesting instructions 1038.

FIG. 11 is a flowchart 1100 illustrating a method for receiving encoded bits including conditionally embedded dynamically shielded information on a bus in accordance with various aspects of the disclosure. The method may be performed by an electronic device (e.g., electronic device 600 of FIG. 6 or apparatus 1000 of FIG. 10).

The electronic device receives a first group of configured encoded bits over a bus 1102. The electronic device then receives a second group of configured encoded bits over the bus 1104. The electronic device determines whether the parity information embedded in the second group of configured encoded bits is the expected parity information 1106. If the parity information is not the expected parity information, the electronic device requests retransmission of the second group of configured encoded bits 1108. Otherwise, the electronic device identifies any forced bits in the second group of configured encoded bits 1110. The electronic device discards the identified forced bits to recover the encoded bits 1112. The electronic device decodes the recovered encoded bits to recover data bits.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method operational in an electronic device, comprising:
    transmitting a first group of encoded bits over a bus during a first clock cycle, the first group of encoded bits having a parity that is of a first parity type;
    generating a second group of encoded bits to be transmitted over the bus, wherein a first subset of the second group of encoded bits includes data bits that are encoded to avoid crosstalk-inducing bit transitions on adjacent lines of the bus; and
    configuring one or more encoded bits of a second subset of the second group of encoded bits to include explicit parity information, while avoiding crosstalk-inducing bit transitions in the second group of encoded bits, when the second group of encoded bits has a parity that is of a second parity type, wherein the explicit parity information is excluded from the second group of encoded bits when the second group of encoded bits has a parity that is of the first parity type; and
    transmitting the second group of encoded bits over the bus during a second clock cycle.

2. The method of claim 1, wherein the parity information enables detection of an erroneous transmission of an encoded bit in the second group of encoded bits, and wherein the second group of encoded bits is configured to include at least one bit transition with respect to the first group of encoded bits despite the erroneous transmission of a bit in the second group of encoded bits.

3. The method of claim 1, wherein the configured one or more encoded bits of the second subset are configured as a data bit or a forced bit that does not carry data.

4. The method of claim 1, wherein the configured one or more encoded bits of the second subset are further configured to ensure at least one bit transition with respect to the first group of encoded bits.

5. The method of claim 4, wherein the at least one bit transition with respect to the first group of encoded bits serves as a clock signal.

6. The method of claim 1, wherein encoded bits of the first subset are transmitted on different lines of the bus than the second subset.

7. The method of claim 1, wherein configuring the one or more encoded bits of the second subset of the second group of encoded bits is performed during a single clock cycle.

8. An apparatus for transmitting data bits over a bus, comprising:
a memory; and
a processing circuit coupled to the memory and configured to:
transmit a first group of encoded bits over the bus during a first clock cycle, the first group of encoded bits having a parity that is of a first parity type;
generate a second group of encoded bits to be transmitted over the bus, wherein a first subset of the second group of encoded bits includes data bits that are encoded to avoid crosstalk-inducing bit transitions on adjacent lines of the bus; and
configure one or more encoded bits of a second subset of the second group of encoded bits to include explicit parity information, while avoiding crosstalk-inducing bit transitions in the second group of encoded bits, when the second group of encoded bits has a parity that is of a second parity type, wherein the explicit parity information is excluded from the second group of encoded bits when the second group of encoded bits has a parity that is of the first parity type; and
transmit the second group of encoded bits over the bus during a second clock cycle.

9. The apparatus of claim 8, wherein the parity information enables detection of an erroneous transmission of an encoded bit in the second group of encoded bits, and wherein the second group of encoded bits is configured to include at least one bit transition with respect to the first group of encoded bits despite the erroneous transmission of a bit in the second group of encoded bits.

10. The apparatus of claim 8, wherein the configured one or more encoded bits of the second subset are configured as a data bit or a forced bit that does not carry data.

11. The apparatus of claim 8, wherein the configured one or more encoded bits of the second subset are further configured to ensure at least one bit transition with respect to the first group of encoded bits.

12. The apparatus of claim 11, wherein the at least one bit transition with respect to the first group of encoded bits serves as a clock signal.

13. The apparatus of claim 8, wherein encoded bits of the first subset are transmitted on different lines of the bus than the second subset.

14. The apparatus of claim 8, wherein configuring the one or more encoded bits of the second subset of the second group of encoded bits is performed during a single clock cycle.

15. A method operational in an electronic device, comprising:
transmitting a first group of encoded bits over a bus during a first clock cycle, the first group of encoded bits having a parity that is of a first parity type, wherein the first parity type is expected on the bus for a transmission during the first clock cycle;
generating a second group of encoded bits to be transmitted over the bus, wherein a first subset of the second group of encoded bits includes data bits that are encoded to avoid crosstalk-inducing bit transitions on adjacent lines of the bus;
configuring one or more encoded bits of a second subset of the second group of encoded bits to ensure that crosstalk-inducing bit transitions in the second group of encoded bits are avoided and to ensure that the second group of encoded bits includes parity information, wherein the second group of encoded bits is configured to have a parity that is of a second parity type to ensure that the second group of encoded bits has at least one bit transition with respect to the first group of encoded bits, wherein the second parity type is expected on the bus for a transmission during a second clock cycle; and
transmitting the second group of encoded bits over the bus during the second clock cycle.

16. The method of claim 15, further comprising:
determining whether the first subset of the second group of encoded bits includes at least one bit transition with respect to the first group of encoded bits,
wherein the configuration of the one or more encoded bits of the second subset of the second group of encoded bits is based on the determination.

17. The method of claim 15, wherein the one or more encoded bits of the second subset of the second group of encoded bits are configured as a data bit or a forced bit that does not carry data.

18. The method of claim 15, wherein the at least one bit transition with respect to the first group of encoded bits serves as a clock signal.

19. The method of claim 15, wherein encoded bits of the first subset are transmitted on different lines of the bus than the second subset.

20. An apparatus for transmitting encoded bits over a bus, comprising:
a memory; and
a processing circuit coupled to the memory and configured to:
transmit a first group of encoded bits over the bus during a first clock cycle, the first group of encoded bits having a parity that is of a first parity type, wherein the first parity type is expected on the bus for a transmission during the first clock cycle;
generate a second group of encoded bits to be transmitted over the bus, wherein a first subset of the second group of encoded bits includes data bits that are encoded to avoid crosstalk-inducing bit transitions on adjacent lines of the bus;
configure one or more encoded bits of a second subset of the second group of encoded bits to ensure that crosstalk-inducing bit transitions in the second group of encoded bits are avoided and to ensure that the second group of encoded bits includes parity information, wherein the second group of encoded bits is configured to have a parity that is of a second parity type to ensure that the second group of encoded bits has at least one bit transition with respect to the first group of encoded bits, wherein the second parity type is expected on the bus for a transmission during a second clock cycle; and transmit the second group of encoded bits over the bus during the second clock cycle.

21. The apparatus of claim 20, wherein the processing circuit is further configured to:
determine whether the first subset of the second group of encoded bits includes at least one bit transition with respect to the first group of encoded bits,
wherein the configuration of the one or more encoded bits of the second subset of the second group of encoded bits is based on the determination.

22. The apparatus of claim 20, wherein the one or more encoded bits of the second subset of the second group of encoded bits are configured as a data bit or a forced bit that does not carry data.

23. The apparatus of claim 20, wherein the at least one bit transition with respect to the first group of encoded bits serves as a clock signal.

24. The apparatus of claim 20, wherein encoded bits of the first subset are transmitted on different lines of the bus than the second subset.

* * * * *